No. 644,046. Patented Feb. 27, 1900.
J. H., D. T. & E. D. ALBRIGHT.
HARROW.
(Application filed Dec. 2, 1899.)
(No Model.)
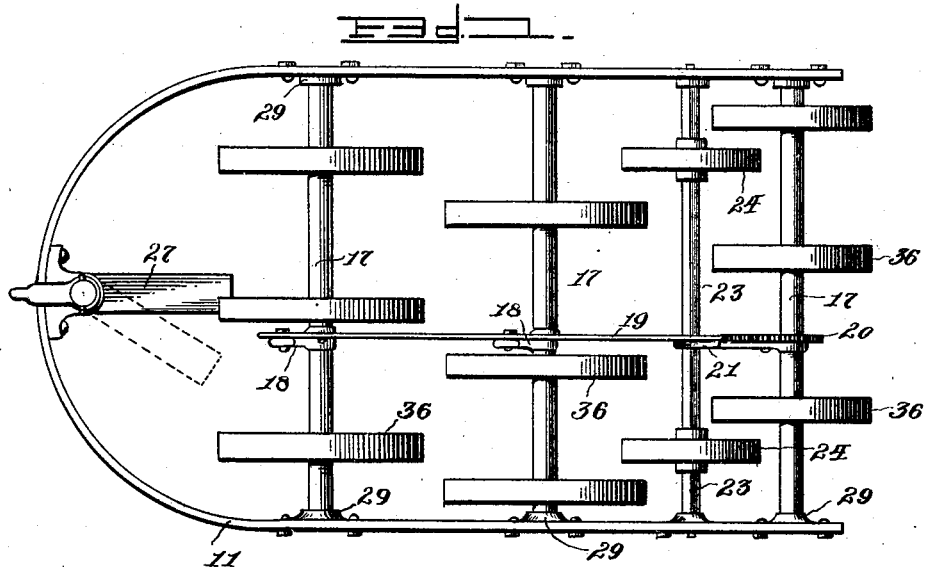
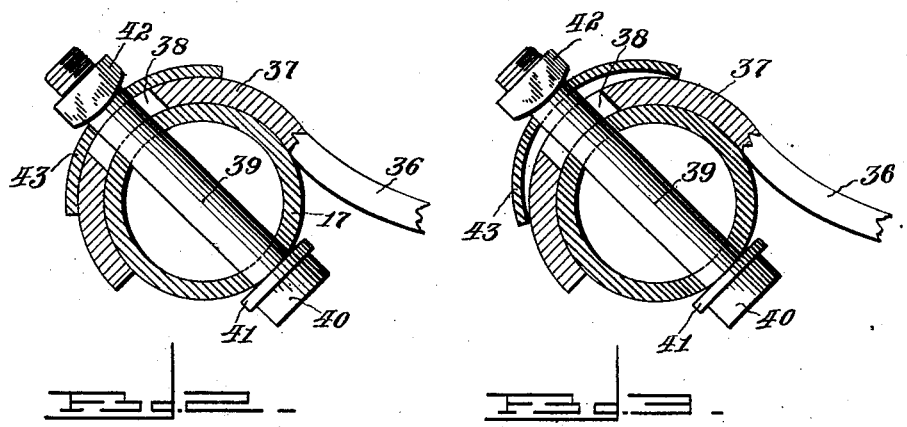

UNITED STATES PATENT OFFICE.

JAMES H. ALBRIGHT, DANIEL T. ALBRIGHT, AND EMERSON D. ALBRIGHT, OF MIFFLINBURG, PENNSYLVANIA.

HARROW.

SPECIFICATION forming part of Letters Patent No. 644,046, dated February 27, 1900.

Original application filed December 29, 1898, Serial No. 700,382. Divided and this application filed December 2, 1899. Serial No. 739,023. (No model.)

*To all whom it may concern:*

Be it known that we, JAMES H. ALBRIGHT, DANIEL T. ALBRIGHT, and EMERSON D. ALBRIGHT, citizens of the United States, residing at Mifflinburg, in the county of Union and State of Pennsylvania, have invented a new and useful Harrow, of which the following is a specification.

The subject-matter of this application constitutes a division of the prior application for improvements in harrows filed by us December 29, 1898, Serial No. 700,382.

The invention embraced in this application relates to means for clamping an earth-treating device, such as a harrow-tooth, to its supporting bar or shaft; and the object in view is to provide a simple construction by which the tooth is held firmly in place, notwithstanding any loosening of the nut on the fastening-bolt, thus providing a compensating clamp which overcomes any tendency of the tooth to become displaced on its support.

With this end in view the invention consists in the combination, with a bar or shaft, of a tooth having a curved arm, a bolt, and an arched yieldable clamp in active relation to the arm of said tooth and to said bolt, the radius of the arched clamp being less than the curvature of the tooth-arm.

The invention further consists in the combination of a shaft or bar, a tooth having a bearing thereon, a bolt passing through the tooth and the shaft, and a permanently-elastic clamp interposed between a nut on the bolt and said tooth, the radius of the spring-clamp being less than the curvature of the tooth.

The invention further consists of a shaft or bar having a circular cross-sectional outline and a transverse opening and an earth-treating device having a curved arm to fit against the shaft or bar and provided with a longitudinal slot in the curved portion, in combination with a bolt passing through the opening of the shaft and a slot of the arm and a spring-clamp of less radius than the curved portion of the arm and interposed between it and the clamping portion of the bolt, said spring-clamp overlapping and concealing the longitudinal slot of the curved arm.

In the drawings, Figure 1 is a plan view of a harrow or of a portion of a harrow with which our improvements are combined. Fig. 2 is an enlarged detail sectional view through the bearing end of a spring-tooth, the shaft or bar for supporting the tooth, and the fastening device for the tooth. Fig. 3 is a view similar to Fig. 2, illustrating the action of the spring-clamp when the nut of the bolt works loose.

Like numerals of reference are used to indicate like and corresponding parts in each of the several figures of the drawings.

In Fig. 1 we have illustrated a portion of a harrow forming the subject-matter of our original application, of which the present application is a division; but it is to be understood that the structure shown by said figure may constitute the harrow itself. In said figure of the drawings the numeral 11 is used to indicate a frame or a part thereof, and this frame supports a series of transverse tooth-supporting shafts or bars 17, the same being mounted to rock or turn in bearings 29, which are applied to the opposing faces on the sides of the frame 11. These shafts or bars carry the series of teeth 36, which are arranged in staggered relation; but the order or arrangement and the number of teeth is not material. The shafts or bars 17 are provided with short arms 18, and to the arms of the series of bars is connected pivotally the adjusting-rod 19, the latter carrying a segment 20, which is adapted to be engaged by a locking device on the adjusting-lever 21. In the rear part of the frame is an axle 23, provided with the wheel 24, and in the front part of the frame is a shoe 27. It is optional whether a shoe or a caster-wheel is employed to sustain the front end of the frame.

The improvement which constitutes the subject-matter of the present invention resides in the means for firmly holding each spring-tooth on the shaft or bar 17 in a manner to compensate for looseness of the nut on the fastening-bolt. Each tooth has its upper end curved to form a bearing-arm 37, which conforms accurately to the contour of the shaft or bar 17. The curved arm of the tooth is provided with a longitudinal slot 38, and the fastening-bolt 39 passes transversely and centrally through the shaft or bar 17 and through the slot 38 in the curved bearing-arm of the tooth. The head 40 of the bolt bears against the washer 41, which is interposed between the face of the shaft or bar and the head of the bolt, although this washer may be omitted. The threaded extremity of the bolt, which protrudes beyond the curved bearing-arm of the tooth, receives a clamping-nut 42, and between said nut and the curved slotted arm 37 of the tooth is interposed an elastic or spring clamp 43, the latter having a transverse opening for the passage therethrough of the threaded end of the bolt. This clamp is made or struck up from a single piece of elastic metal, and it is necessarily segmental or arched in longitudinal section. The radius of the spring-clamp is less than that of the curved bearing-arm 37 of the spring-tooth, and when the tooth and the clamp are assembled in operative relation to the bar or shaft and to the fastening-bolt this elastic arched clamp does not conform accurately to the curvature of the bearing-arm on the tooth. The nut 42 is designed to be turned on the threaded end of the bolt for the purpose of compressing the elastic clamp, so as to make the latter bear firmly upon the curved arm of the tooth; the resiliency of said clamp causing it to press against both the arm of the tooth and the nut of the bolt. If the nut works loose on the bolt, the clamp by its inherent elasticity presses against the nut and said arm of the tooth, and the strength of the clamp is sufficient to bind the arm of said tooth against the shaft or bar for the purpose of holding the tooth in proper position thereon, notwithstanding the accidental movement of the nut 42 away from the arm of the tooth and the shaft or bar.

The opening in the clamp through which the bolt passes corresponds to the cross-sectional area of said bolt, so as not to leave a space therebetween, and the clamp is thus adapted to close the outer open side of the slot 38 and prevent the entrance of dirt and foreign matter therein. It is evident that the lodgment of dirt in the slot would tend to close the same; but the slot is closed by the clamp under all adjustments of the arm 36, forming a part of the earth-treating device or tooth.

It will be understood that the slotted curved arm of the earth-treating device permits a limited adjustment of said tooth or device around the shaft or bar, so that the position of the tooth may be changed according to the desired penetration. Each tooth is held firmly and rigidly on the bar or shaft by the bolt and the spring-clamp, and by having the clamp act against the nut it minimizes the tendency of the nut to work loose on the bolt.

We do not limit ourselves to the employment of our improvement in the construction of the harrow shown by Fig. 1 or in our original application, to which reference has been made, because it is evident that the improved construction may be employed in various types of harrows and other agricultural machinery.

Having thus described the invention, what we claim is—

1. The combination with a bar or shaft, of a tooth having a curved arm, a bolt, and an arched yieldable clamp in active relation to the arm of said tooth and to said bolt, the radius of the arched clamp being less than the curvature of the tooth-arm.

2. The combination with a shaft or bar, a tooth having a bearing thereon, a bolt passing through the tooth and the shaft, and a permanently-elastic clamp interposed between a nut on the bolt and said tooth, the radius of the spring-clamp being less than the curvature of the tooth.

3. The combination with a shaft or bar having a circular cross-sectional outline and a transverse opening, and an earth-treating device having a curved arm to fit against the shaft or bar and provided with a longitudinal slot in the curved portion, of a bolt passing through the opening of the shaft and a slot of the arm, and a spring-clamp of less radius than the curved portion of the arm and interposed between it and the clamping portion of the bolt, said spring-clamp overlapping and concealing the longitudinal slot of the curved arm.

In testimony that we claim the foregoing as our own we have hereto affixed our signatures in the presence of two witnesses.

JAMES H. ALBRIGHT.
DANIEL T. ALBRIGHT.
EMERSON D. ALBRIGHT.

Witnesses:
CHESTER E. ALBRIGHT,
GEO. F. SKELL.